(12) United States Patent
Lee et al.

(10) Patent No.: US 7,530,159 B2
(45) Date of Patent: May 12, 2009

(54) METHOD OF DISTORTION CORRECTION IN SHRINK PROCESSES FOR FABRICATION OF WRITE POLES

(75) Inventors: Kim Y. Lee, Fremont, CA (US); Jyh-Shury Lo, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 422 days.

(21) Appl. No.: 11/478,787

(22) Filed: Jun. 29, 2006

(65) Prior Publication Data

US 2008/0000076 A1  Jan. 3, 2008

(51) Int. Cl.
*G11B 5/127* (2006.01)
*H04R 31/00* (2006.01)

(52) U.S. Cl. .............. 29/603.16; 29/603.13; 29/603.15; 29/603.18; 216/62; 216/65; 216/66; 360/121; 360/122; 360/317; 360/324; 427/127; 427/128; 451/5; 451/41

(58) Field of Classification Search . 29/603.13–603.16, 29/603.18; 360/121, 122, 317, 324–327; 451/5, 41; 216/62, 65, 66
See application file for complete search history.

(56) References Cited

U.S. PATENT DOCUMENTS

| | | | |
|---|---|---|---|
| 5,600,519 A | 2/1997 | Heim et al. | |
| 5,621,596 A | 4/1997 | Santini et al | |
| 5,802,700 A | 9/1998 | Chen et al. | |
| 6,696,226 B1 | 2/2004 | Dinan et al. | |
| 6,757,141 B2 | 6/2004 | Santini et al. | |
| 7,343,666 B2 * | 3/2008 | Lee et al. .................. | 29/603.16 |
| 2002/0042029 A1 | 4/2002 | Kamijima et al. | |
| 2004/0020778 A1 | 2/2004 | Lin et al. | |
| 2004/0265710 A1 | 12/2004 | Kohler et al. | |

* cited by examiner

*Primary Examiner*—Paul D Kim
(74) *Attorney, Agent, or Firm*—Patent Law Office of Larry Guernsey; Larry B. Guernsey (57) ABSTRACT

A method is presented for fabricating a write pole for a magnetic recording head, wherein a photoresist layer is formed on a wafer stack. A target P2 pole configuration is provided, and a photomask having a pattern is produced, and the pattern is transferred to the photoresist to create a patterned photoresist having at least one photoresist channel. A layer of photoresist channel shrinking film used to produce a reduced width photoresist channel in an expanded photoresist. A P2 pole tip is formed within the reduced width photoresist channel. The P2 pole tip is then compared to the target P2 pole configuration to identify distortions, which are then used to produce a distortion-corrected photomask. The distortion-corrected photomask is then used to produce a distortion-corrected expanded photoresist, which is then used to produce a distortion-corrected P2 pole tip.

18 Claims, 12 Drawing Sheets

METHOD OF DISTORTION CORRECTION IN SHRINK PROCESSES FOR FABRICATION OF WRITE POLES

BACKGROUND OF THE INVENTION

1. Field of the Invention

The present invention relates generally to manufacture of heads for data storage devices and more specifically to a write head for a hard disk drive.

2. Description of the Prior Art

As the areal data storage density of magnetic media steadily increases and track widths become narrower and closer together, there is more and more chance of interference from adjacent tracks. This interference has become so common that the acronym "ATI" for Adjacent Track Interference has been coined. This interference naturally increases write and read errors, and is therefore undesirable. The design of write heads in general is a balance between producing poles which are narrow enough to prevent ATI and having poles broad enough to allow adequate magnetic flux flow to write or overwrite data satisfactorily. As track widths become narrower, this balance becomes ever more delicate. In an effort to produce more narrow pole tips, channel shrinking films, as discussed below, have become more widely used in the fabrication process.

Figure 3:
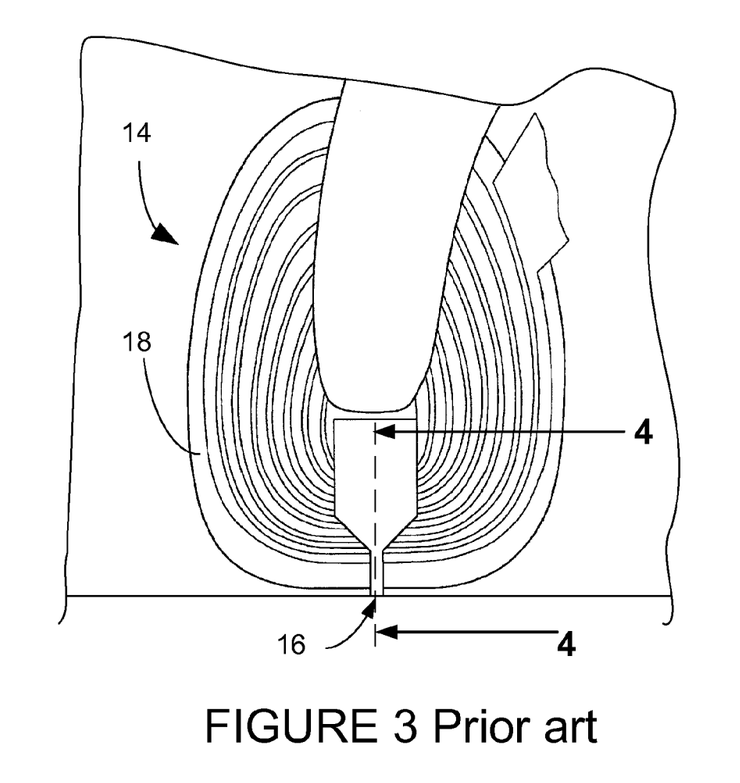
FIG. 3 shows a top plan view of an exemplary read/write head.
Figure 4:
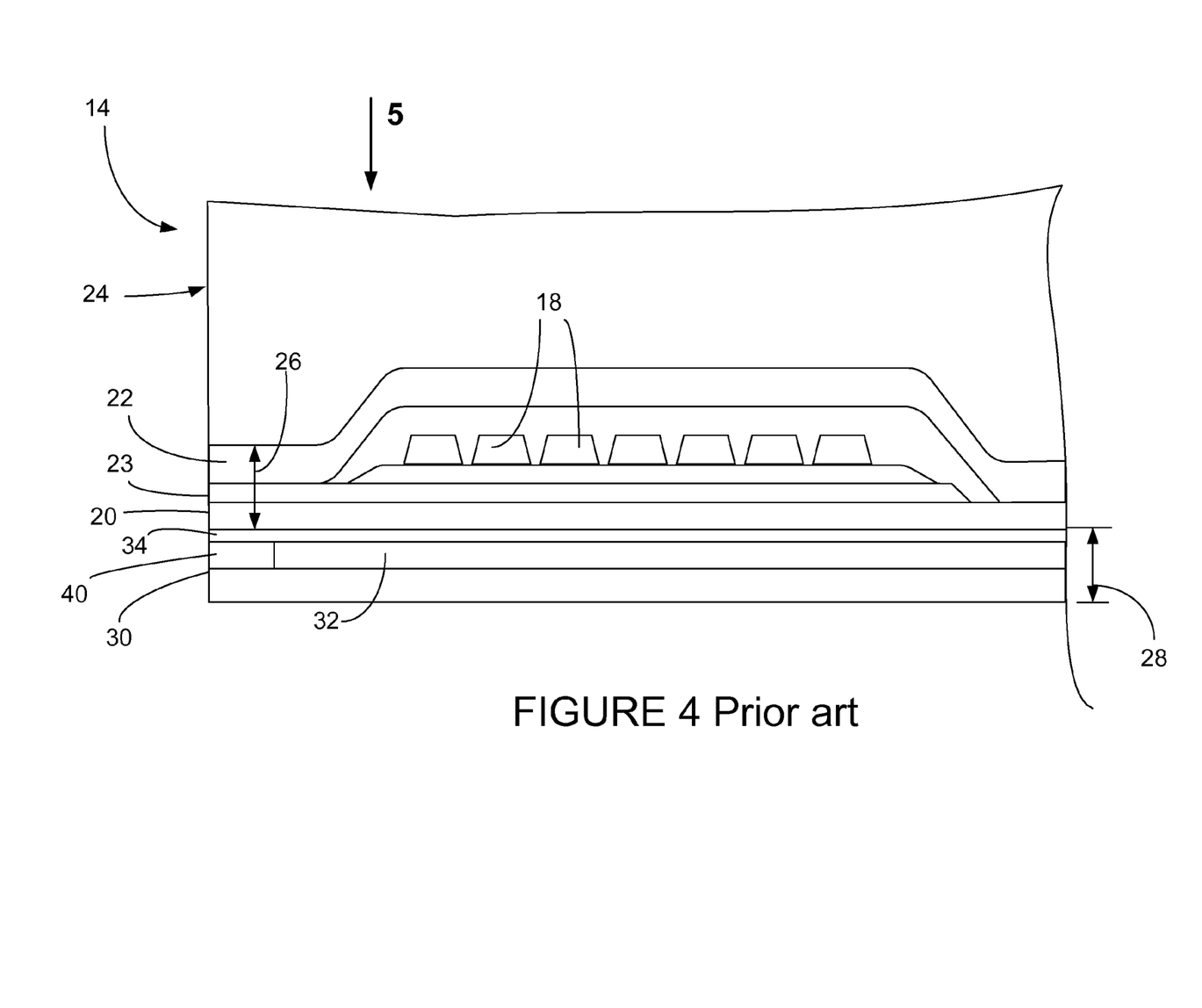
FIG. 4 is a cross-section view of an exemplary read/write head.

A typical read/write head 14 is shown in FIG. 4, which is a side cross-section view of the slider 16 shown in FIG. 3. The magnetic head 14 includes a induction coil 18, P1 pole 20, and a second pole P2 22 which is separated from P1 pole 20 by write gap 23. The P1 pole 20, second pole P2 22 and write gap 23 can be considered together to be included in the write head 26. Magnetic flux is induced when current is passed through the coil 18 and then passes through the tip of the P2 22 pole, across the gap 23, through the recording medium (not shown) and returns through the P1 pole 20 to complete the magnetic circuit. The magnetic flux thus acts to write data to the magnetic medium.

Magnetic flux flows in lines which are not straight, and thus tends to spread out slightly as it traverses the gap 23 separating the poles P1 20 and P2 22. The amount of "spread" influences the ATI and is influenced by the shape and configuration of the poles P1 20 and P2 22.

Figure 5:
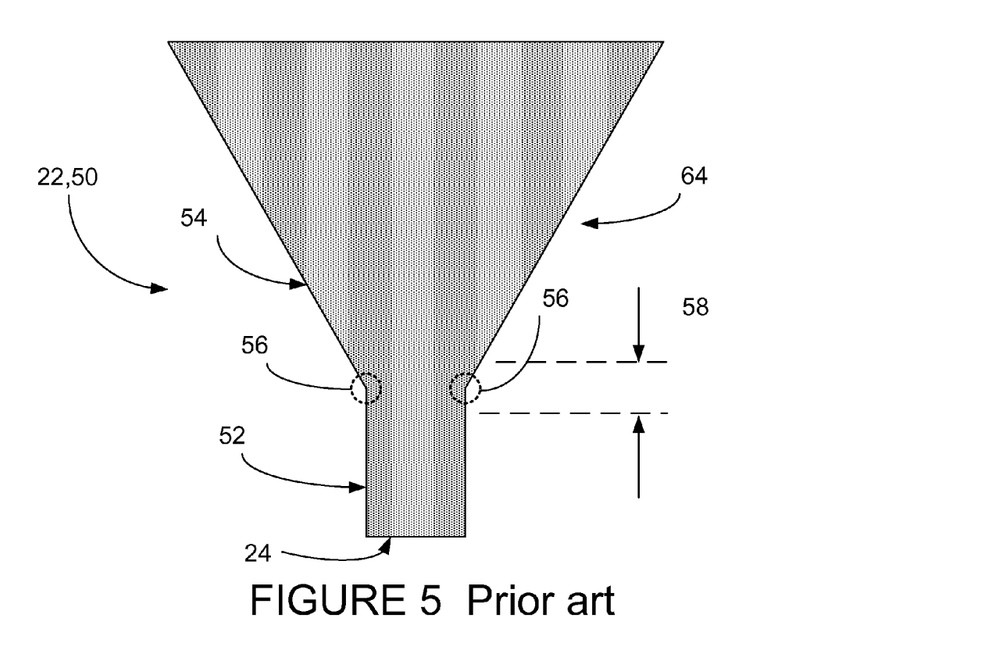
FIG. 5 is a top plan view of the P2 pole tip as seen from direction arrow 5 of FIG. 4.

FIG. 5 illustrates a top plan view of the pole tip 50 of the P2 pole 22 as seen from the direction of arrow 5 shown in FIG. 4. A portion of the pole tip 50 is included in the ABS 24. The pole tip 50 includes two basic structural portions, namely a straight portion 52 having a basically rectangular shape ending in the ABS 24, and a flared portion 54, which is basically a truncated triangular shape or a trapezoid. The points at which the two portions are connected or where the straight portion 52 flares out into the flared portion 54 are called the flare points 56. It is important for the proper flow of magnetic flux that the flare points 56 are configured within a preferred range 58 relative to the ABS 24.

As is generally known, the process of forming the P2 pole 22 begins with a wafer stack having a layer of photoresist formed on its surface. A photomask with a pattern of opaque and transparent areas is placed between a light source and the layer of photoresist. The areas that are shielded from the light exposure will remain, and the photoresist areas where light hits the photoresist are stripped to create channels which will be filled with plating material to form the P2 pole. The photoresist thus acts as a kind of mold, or plating frame as it is called. The width of the P2 pole tip thus is largely dependent on the width of the channel in the photoresist which acts as its mold. If the channel can be reduced in width, then the width of the final plated P2 pole piece will also be reduced. Recently materials have been utilized which cause the photoresist to expand and thus reduce the channel width, and thus the width of the final P2 pole. These materials are generally referred as photoresist channel shrinking materials and are general applied as a film over the patterned photoresist and then baked to activate the shrinking process.

The photoresist channel shrinking film referred to above is any suitable film that assists in the shrinking of a channel or trench formed within a patterned photoresist. One suitable film is commercially available from Tokyo Ohka Kogyo (TOK) Co., Ltd. in Kanagawa, Japan, and referred to as SAFIER™ (Shrink Assist Film for Enhanced Resolution) coating; product FSC-9220 GM. SAFIER™ is a trademark of TOK Co., Ltd. Another suitable film is commercially available from Clariant Corporation of Muttenz, Switzerland, and referred to as a RELACS® (Resolution Enhancement Lithography Assisted by Chemical Shrinking) coating; product R-500 may be utilized, for example in the present invention. RELACS is a registered trademark of the Clariant Corporation. Both of these films are water-soluble and removable by applying water after use. These two photoresist channel shrinking films serve the same purpose of shrinking the channel of patterned photoresist when baked, but the way in which these films achieve this result is different.

Diffused acid generated during the photoresist exposure remains in the vicinity of the sidewall. Using SAFIER film, during the baking process, this residual acid in the photoresist will diffuse into the channel and act to shrink the SAFIER material, which pulls the photoresist material with it and thus causes the channel to reduce in width. After the SAFIER film is dissolved in the subsequent water rinse, the spacing within the channel determines the width of the patterned element to be finally obtained, and the decrease in the spacing within the channel contributes to reducing the width of the element.

Alternatively, when using RELACS film, after exposure and development of the photoresist to produce the patterned resist, acids are also released from sidewalls within the channel of the patterned photoresist. These acids at the vicinity of the photoresist sidewall diffuse into and react with RELACS. These acids make part of the RELACS material non-soluble in water, and thus not removable from the channel. This also produces a reduction in width of the channel, but by a different mechanism than used by SAFIER.

For the sake of simplifying the present discussion, the photoresist in the channel will be spoken of as "expanding" by whatever means and the channel referred to as ":shrinking". Thus the term "shrink film" will be used to include materials such as SAFIER and RELACS which shrink the channel, and thus the eventually fabricated pole piece, while portions of the patterned photoresist will expand. It will also be understood that either or both SAFIER and/or RELACS or other materials which act in a similar manner can be used, as will be understood by those skilled in the art.

Figure 16:
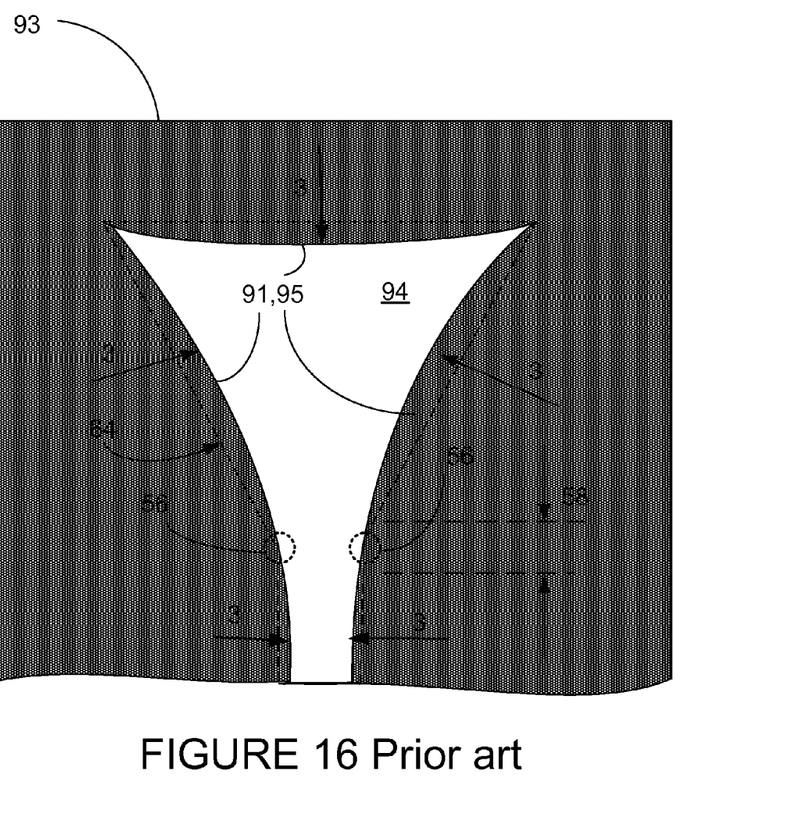
FIG. 16 shows a top plan view of an expanded photoresist compared to a target P2 configuration to be achieved showing distortions in the photoresist.

If the expansion of the photoresist material using these processes were perfectly linear, this might produce the ideal result desired. However, due to the existence of corners and other geometrical features of the photoresist channel, the walls of the expanded photoresist do not move linearly, but instead tend to bulge in places, producing a configuration more closely resembling the distorted expanded photoresist 93 shown in FIG. 16. This produces a distorted channel 94 having distortions 91, such as convex walls 95. If P2 pole plating material were used to fill this distorted channel 94, a distorted P2 pole would be produced. The flare points 56, which ideally would be positioned with the preferred range 58, would thus be either moved out of the preferred range 58, or perhaps not even recognizable or locatable. FIG. 16 shows an example where the walls are so curved that the identification of a "flare point" as a discreet inflection point is not possible.

The flare points discussed are a crucial feature, but not the only crucial feature in the geometry of the write head. Other geometric factors will also be affected by the distortions in the expanded photoresist that may cause problems in the operation of the write head and thus of the disk drive as a whole.

Thus there is a need for a method of fabrication which corrects for distortions in the expanded photoresist and thus in the P2 pole tip produced from the photoresist channel shrinking film process.

SUMMARY OF THE INVENTION

A preferred embodiment of the present invention is a method for fabricating a write pole for a magnetic recording head. A photoresist layer is formed on a wafer stack. A target P2 pole configuration is provided, and a photomask having a pattern is produced, and positioned between the photoresist layer and a light source. The photomask and the photoresist are exposed to the light source such that the pattern of the photomask is transferred to the photoresist to create a patterned photoresist having at least one photoresist channel. A layer of photoresist channel shrinking film is formed on the patterned photoresist, and baked to produce a reduced width photoresist channel in the now expanded photoresist. A P2 pole tip is plated within the reduced width photoresist channel to form a P2 pole tip, which is then compared to the target P2 pole configuration to identify distortions. These identified distortions are then used to produce a distortion-corrected photomask, which is then used to produce a distortion-corrected expanded photoresist. The distortion-corrected expanded photoresist is then used to produce a distortion-corrected P2 pole tip.

It is an advantage of the present invention that distortions in the photoresist can be corrected and thus P2 pole tips can be produced which also have these distortions corrected.

It is another advantage of the present invention that manufacturing yields for write heads are improved.

It is a further advantage of the present invention that overall performance of the disk drive is improved by utilizing write heads with corrected geometry.

It is yet another advantage of the present invention that write poles can be produced with flare points that are positioned within an acceptable range so that magnetic flux is channeled appropriately for good writing and re-writing performance.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
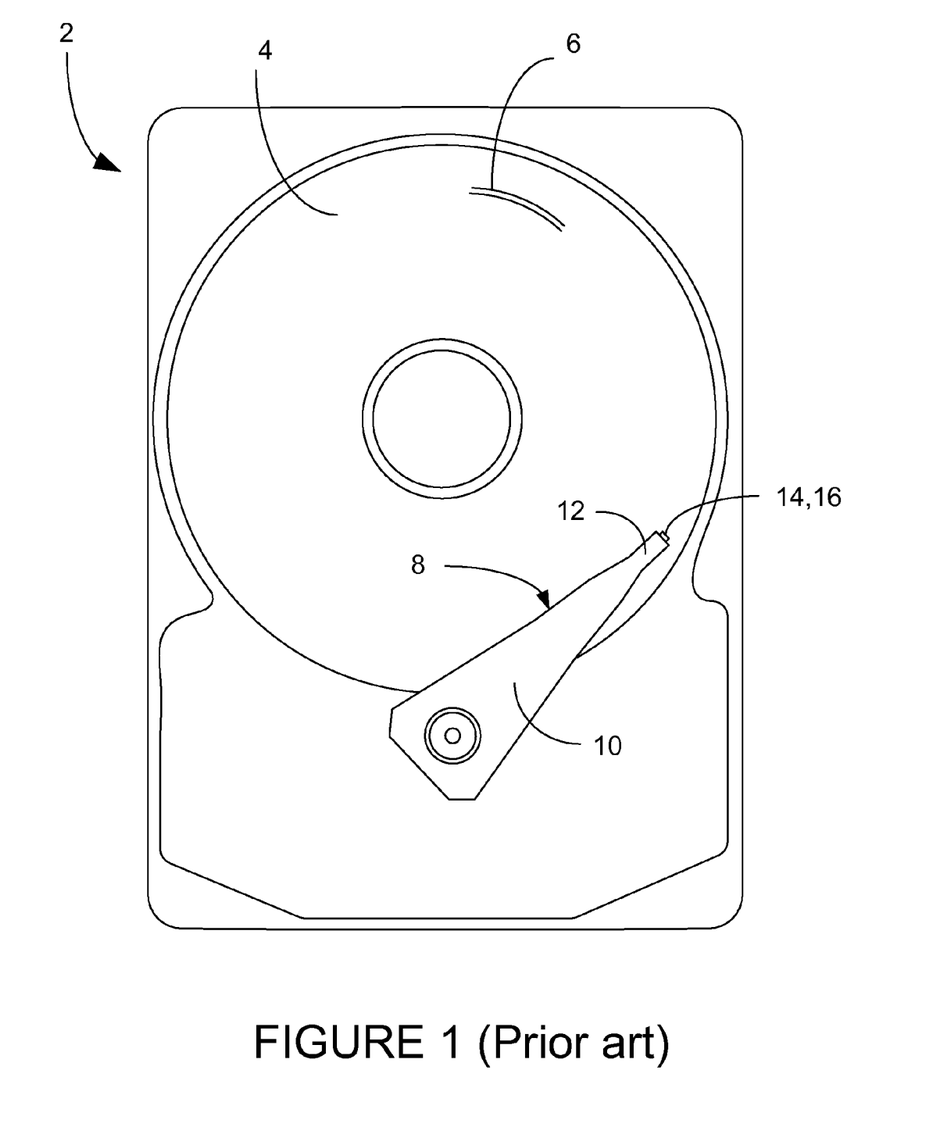
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
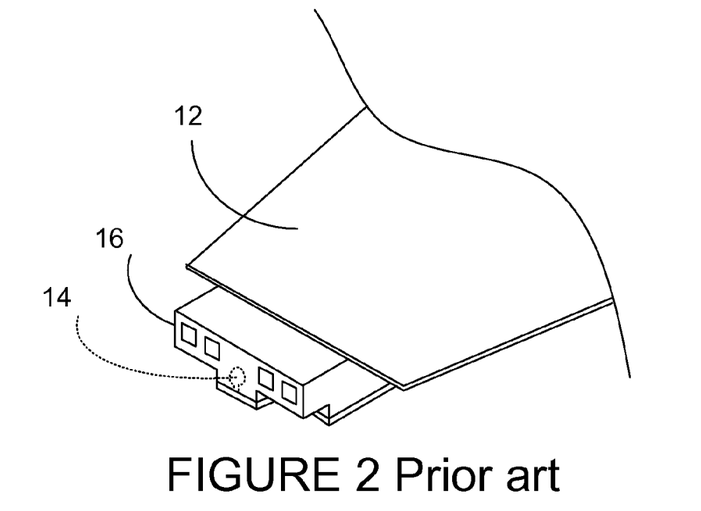
FIG. 2 illustrates a perspective view of view of an exemplary slider and suspension.

FIG. 2 shows a slider 16 in more detail being supported by suspension 12. The magnetic head 14 is shown in dashed lines, and in more detail in FIGS. 3 and 4. The magnetic head 14 depicted in FIGS. 3 and 4 include an induction coil 18, P1 pole 20, and a second pole P2 22 which is separated from P1 pole 20 by write gap 23. The P1 pole 20, second pole P2 22 and write gap 23 can be considered together to be included in the write head 26.

A read sensor 40 is sandwiched between a first magnetic shield, designated as S1 30 and a second magnetic shield S2 34, and these elements together make up the read head 28. An insulation layer 32 also separates S1 30 and S2 34 in the area behind the read sensor 40. When in use, the magnetic head 14 flies on an air cushion between the surface of the disk 4 and the air bearing surface (ABS) 24 of the slider 16.

As discussed above, magnetic flux is induced when current is passed through the induction coil 18. The flux then passes through the tip of the P2 22 pole, across the gap 23, through the recording medium (not shown) and returns through the P1 pole 20 to complete the magnetic circuit. The magnetic flux thus acts to write data to the magnetic medium.

Magnetic flux flows in lines which are not straight, and thus tends to spread out slightly as it traverses the gap 23 separating the poles P1 20 and P2 22. The amount of "spread" produced depends on the shape and configuration of the poles P1 20 and P2 22.

FIG. 5 illustrates a top plan view of the pole tip 50 of the P2 pole 22 shown in FIG. 4. A portion of the pole tip 50 is included in the ABS 24. The pole tip is composed of two basic structural portions, namely a straight portion 52 having a basically rectangular shape ending in the ABS 24, and a flared portion 54, which is basically a truncated triangular shape or a trapezoid. The points at which the two portions are connected or where the straight portion 52 flares out into the flared portion 54 are called the flare points 56. It is important for the proper flow of magnetic flux that the flare points 56 are configured within a preferred range 58 relative to the ABS 24.

The P2 pole tip 50 shown in the figure can be considered the acceptable or target configuration for the finished P2 pole tip design, including acceptable ranges of parameters or limitations for the geometric features of the P2 pole tip, including the positions of the flare points. Thus, for purposes of this application, this acceptable configuration will be referred to as target P2 configuration 64. It will be understood that the preferred range 58 of the flare points 56 indicated will be considered as the parameter of interest in this discussion, but that there are other parameters which will have preferred ranges of acceptability as well, and these are not shown or discussed here.

Figure 6:
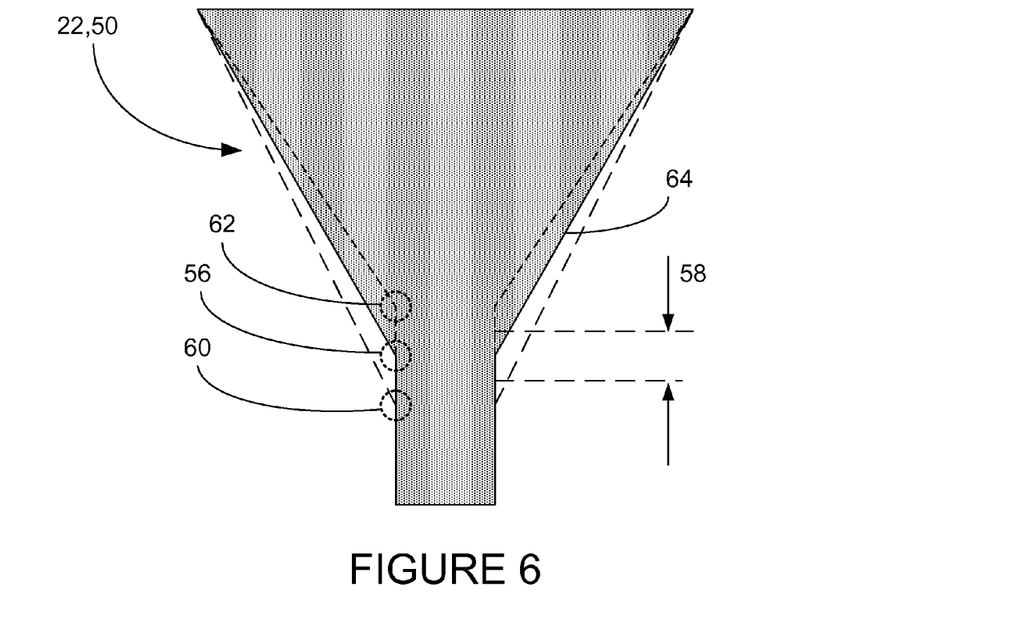
FIG. 6 is a top plan view of a P2 pole tip showing various locations of the flare points compared to a range of acceptable positions.

FIG. 6 shows the outline of the pole tip 50 target P2 configuration 64 having the flare points 56 within the preferred range 58, as well as the outline in dashed lines of two other configurations in which the flare points lie outside the preferred range 58. In the first of these, the flare point lies too near the ABS 24, and thus will be referred to as near flare point 60. In this case, the straight portion 52 is too short with the result that the magnetic flux flow will not be optimal. In the second case, the flare point lies too far from the ABS 24, and thus will be referred to as far flare point 62. In this case, the straight portion 52 is too long with the result that the magnetic flux flow will also not be optimal.

Another common occurrence is that the sides of the distorted pole will often be curved to such an extent that the location of the flare points are not identifiable at all, as will be discussed below. FIG. 16 shows an example where the walls are so curved that the identification of a "flare point" as a discreet inflection point is not possible.

These differences in the configuration of the flare points results from the configuration of the photomask and the resulting patterned photoresist which is used to form the P2 pole 22. The method of fabrication of the present invention is illustrated and described with reference to FIGS. 7-20.

Figure 7:
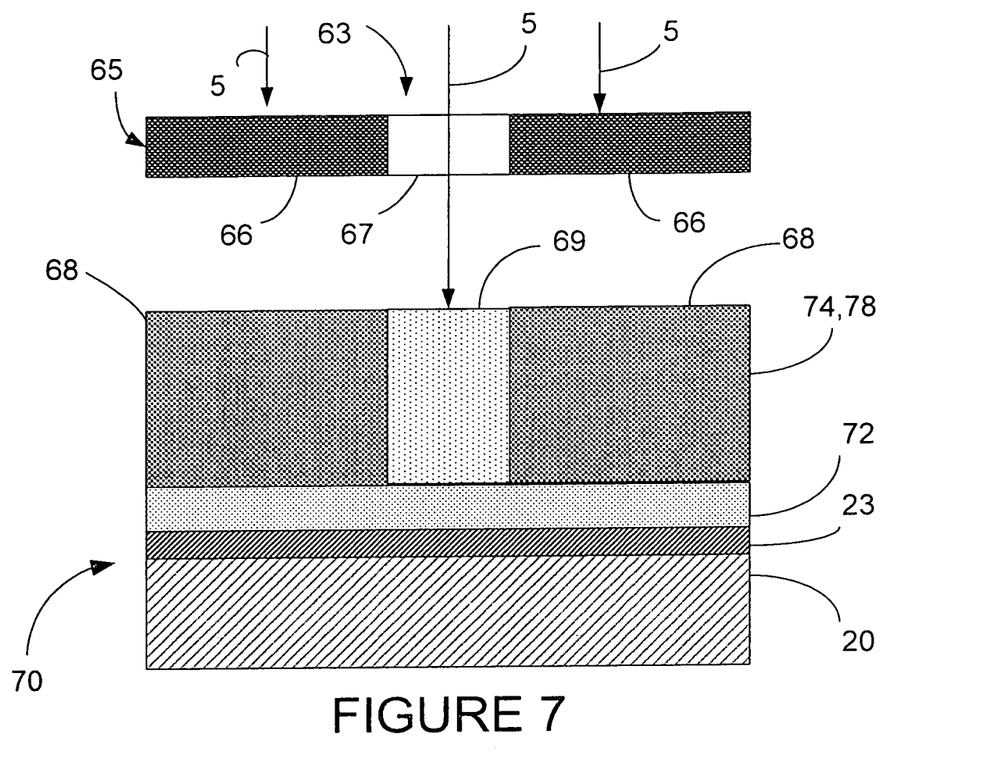
FIGS. 7-14 show front plan views as seen from the ABS of various stages in the fabrication of an exemplary P2 pole tip.

In FIG. 7, a wafer stack 70 is shown which includes the P1 pole 20 material upon which a write gap layer 23 has been formed, with a seed layer 72 above. Photoresist material 74, also referred to as an F4 plating frame, is formed on the seed layer 72. A photomask 65, including opaque areas 66 and transparent areas 67 which form a photomask pattern 63, is positioned between the photoresist material 74 and a light energy source (not shown) which produces light beams 5. Where light passes through the transparent areas 67 of the photomask 65, the photoresist 74 is exposed and becomes soluble to developer and thus can be subsequently removed. The opaque areas 66 block light 5 from reaching the photoresist 74 and thus leave unexposed areas 68.

Figure 8:
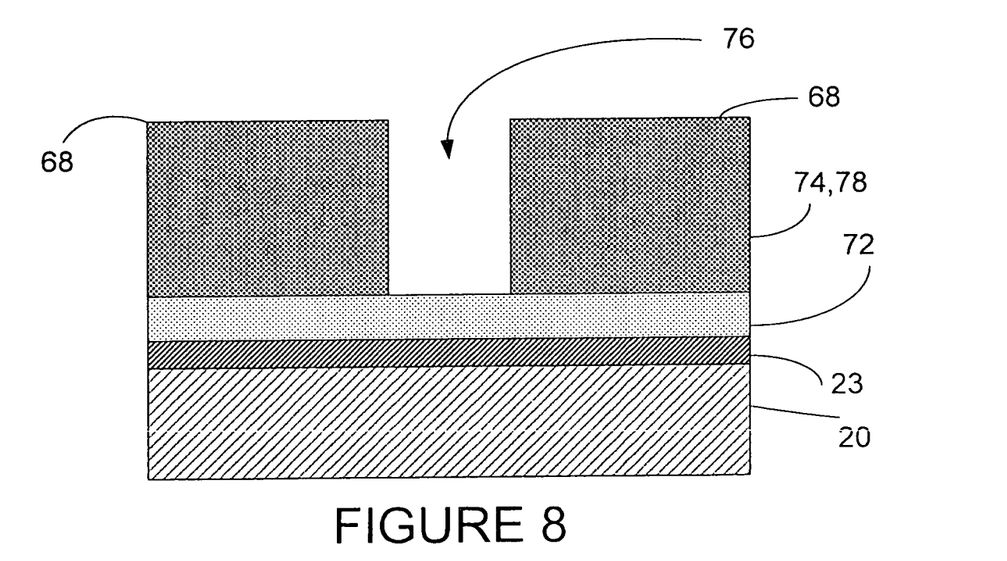

The exposed areas 69 will remain soluble and are subsequently stripped to form the photoresist channel 76 referring now also to FIG. 8. The photoresist material 74 has thus been shaped to form a patterned photoresist 78 which surrounds the photoresist channel 76. The photoresist channel 76 thus reproduces in open space the configuration of the transparent areas 67 of the photomask 65.

Figure 9:
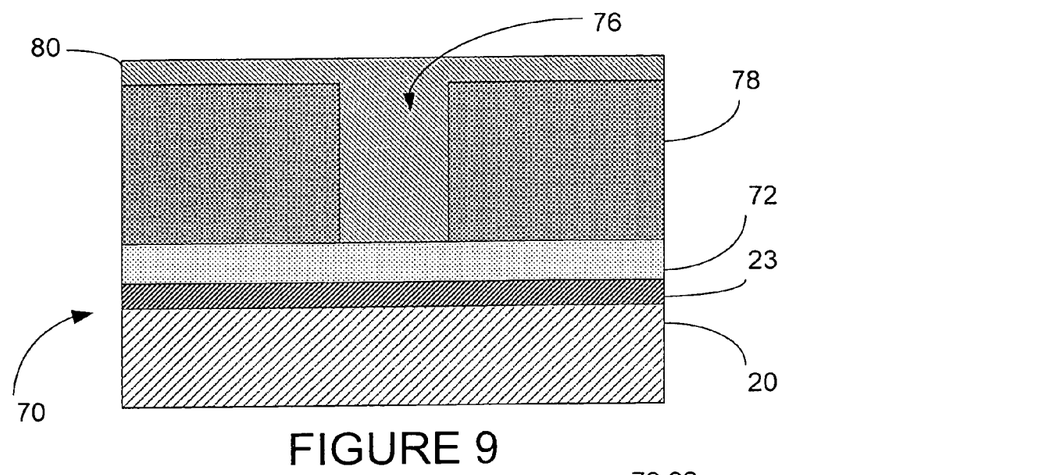

As shown in FIG. 9, a photoresist channel shrinking film 80 is then formed over the patterned photoresist 78 filling the photoresist channel 76. The photoresist channel shrinking film 80 is any suitable film that assists in the shrinking of a channel or trench formed within the patterned photoresist 78. One suitable film is commercially available from Tokyo Ohka Kogyo (TOK) Co., Ltd. in Kanagawa, Japan, and referred to as SAFIER™ (Shrink Assist Film for Enhanced Resolution) coating. Another suitable film is commercially available from Clariant Corporation of Muttenz, Switzerland, and referred to as a RELACS® (Resolution Enhancement Lithography Assisted by Chemical Shrinking) coating. Both of these films are water-soluble and removable by applying water after use, although the exact mechanism by which they shrink the channels differ, as discussed above.

For the sake of simplifying the present discussion, the photoresist in the channel will be spoken of as "expanding" by whatever means and the channel referred to as ":shrinking". Thus the term "shrink film" will be used to include materials such as SAFIER and RELACS which shrink the channel, and thus the eventually fabricated pole piece, while portions of the patterned photoresist will expand. It will also be understood that either or both SAFIER and/or RELACS or other materials which act in a similar manner can be used, as will be understood by those skilled in the art.

These two photoresist channel shrinking films serve the same purpose of shrinking the photoresist channel 76 when baked. It will be understood that the shrinking of the photoresist channel 76 is accomplished by expanding the patterned photoresist 78, and thus the photoresist channel shrinking film 80 could also be referred to as "photoresist expanding film", although the term "shrink film" is more commonly used.

Figure 10:
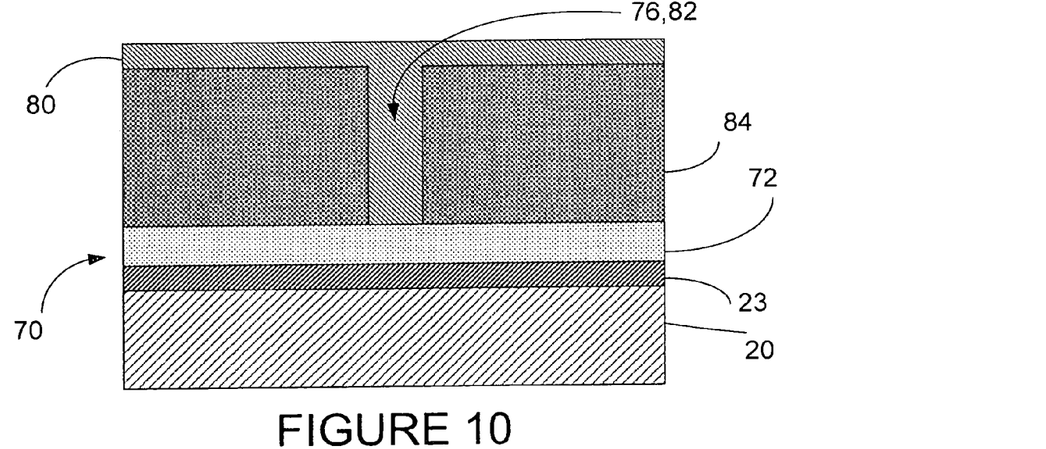

Referring now to FIG. 10, wafer stack 70 with the photoresist channel shrinking film 80 over the patterned photoresist 78 is then baked. The baking process causes photoresist channel 76 within the patterned photoresist 78 to shrink to a reduced-width channel 82. The heating temperature and baking time are not limited to any particular values as long as the temperature is sufficient high enough to cause thermal shrinkage of the photoresist channel shrinking film 80. Preferably, the heat treatment may be performed within a temperature range of about 80-130° C. for 60-240 seconds. Also preferably, heating is not so excessive that it causes thermal fluidizing of the patterned photoresist 78.

Using this process, ideally each side of the patterned photoresist 78 flanking the photoresist channel 76 is extended proportionately so that the reduced-width channel 82 is substantially centered with respect to the original photoresist channel 76. The expanded photoresist material will be referred to as the expanded photoresist 84.

Figure 11:
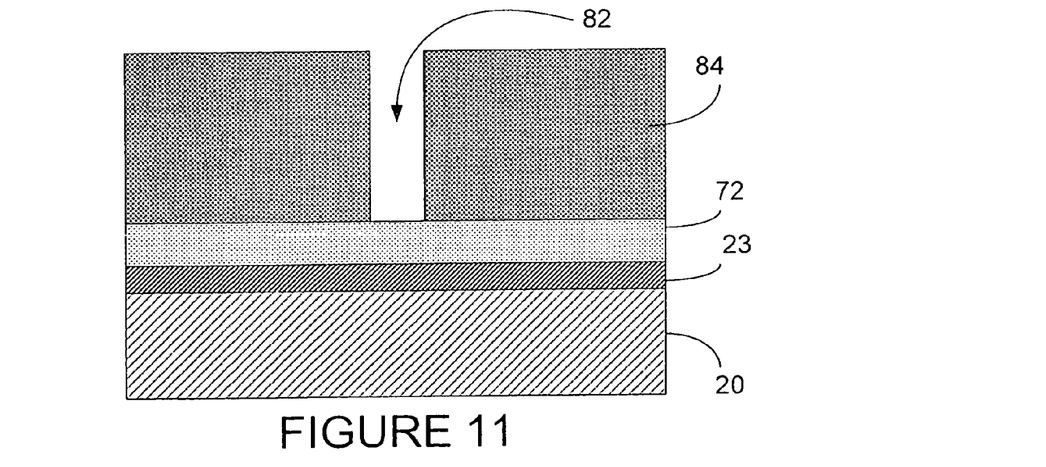

The photoresist channel shrinking film 80 (FIG. 10) is then removed by rinsing with water and the resulting structure with the film removed is shown in FIG. 11. Preferably, pure water is used in the rinse for between about 30-240 seconds. Note also that the steps of applying the film (FIG. 9), baking to reduce the width (FIG. 10), and rinsing may be repeated for further reductions in the width, as desired.

Figure 12:
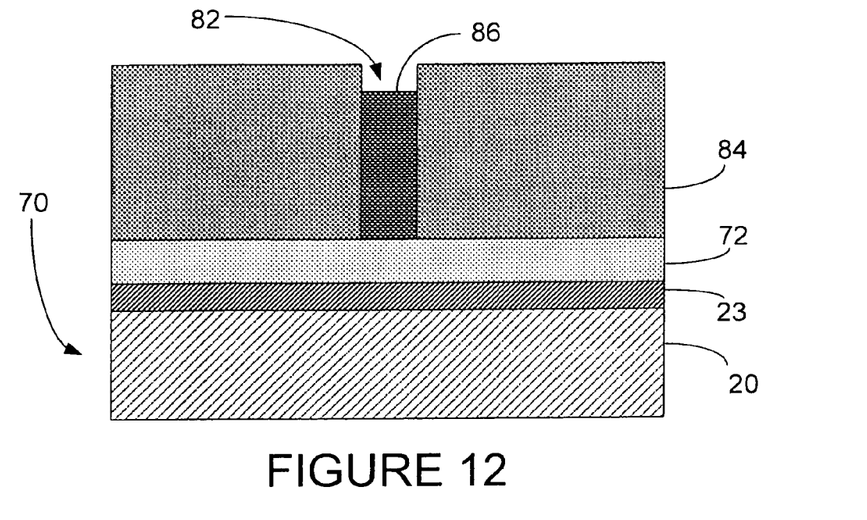

The P2 pole tip may then be electroplated into the channel 82 and in FIG. 12, P2 pole tip material 86 has filled the reduced width channel 82 that was formed in the expanded photoresist 84.

Figure 13:
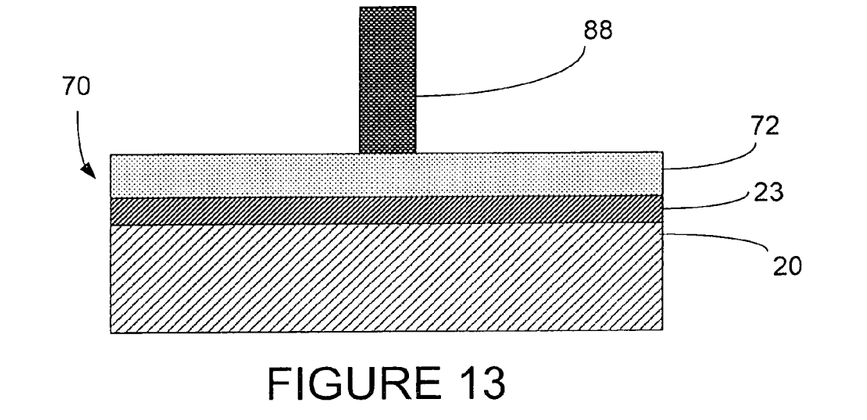

The photoresist is next removed such as by resist stripping to leave the as-plated P2 pole 88, as shown in FIG. 13.

Figure 14:
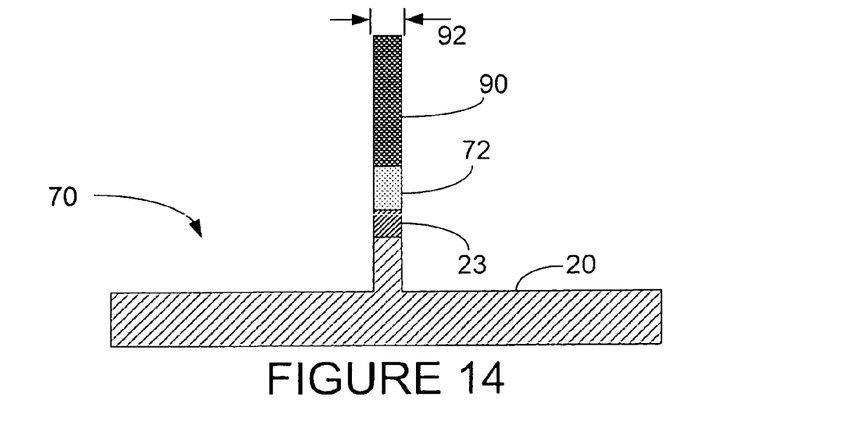

The wafer stack 70 including the as-plated P2 pole 88, is next trimmed by a material removal source, typically ion milling, as shown in FIG. 14. This produces the trimmed P2 pole 90 which has been reduced to its preferred track width 92, along with notching of the seed layer 72, gap layer 23, and portions of the P1 pole layer 20 as is known to those skilled in the art.

So far in this discussion, the process steps have been viewed from the ABS, but it must be understood that the P2 pole is a complex structure which preferably takes the shape shown in FIG. 5, when viewed from above at an angle 90 degrees from the ABS. This top view corresponds to the direction arrow 5 seen in FIG. 4. FIGS. 15-20 are top plan views of the photoresist material 74, expanded photoresist 84 and photomasks 65, 100 used to produce the P2 pole tip 50.

Figure 15:
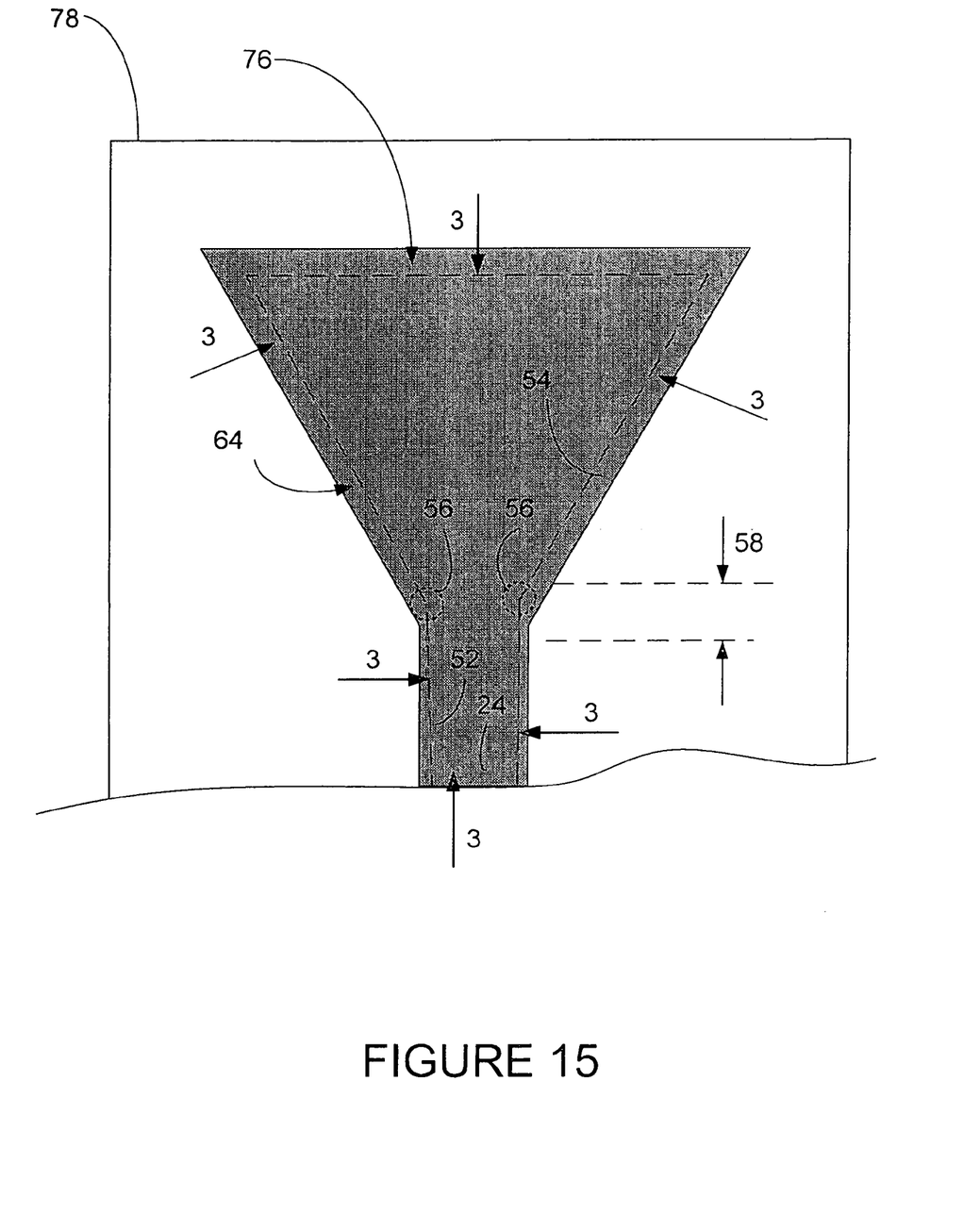
FIG. 15 shows a top plan view of a patterned photoresist compared to a target P2 configuration to be achieved after the photoresist has been expanded.
Figure 17:
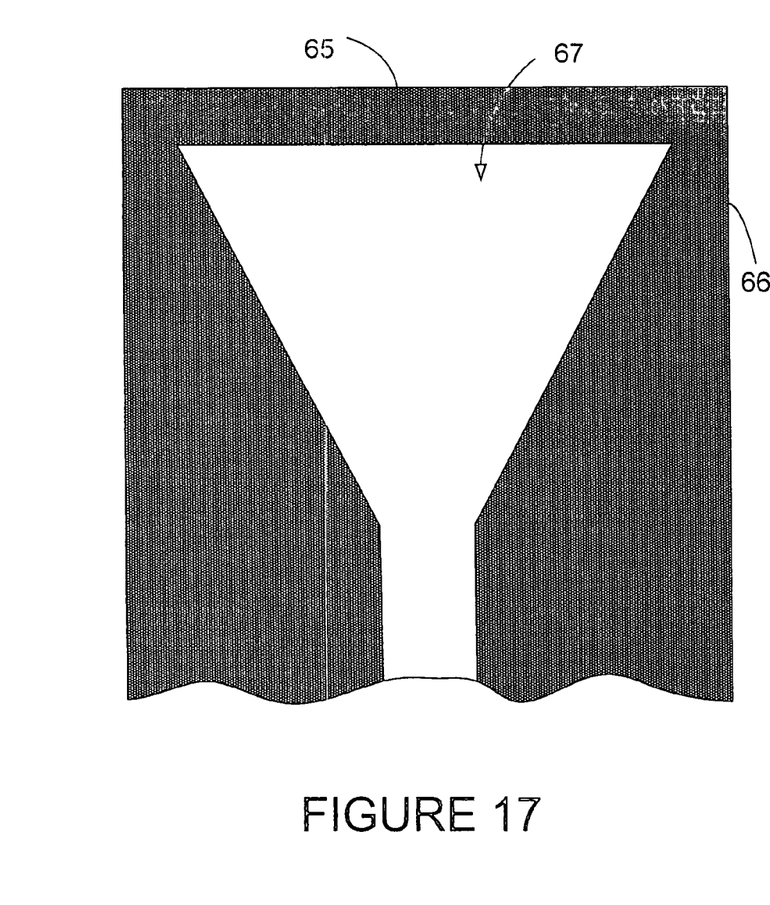
FIG. 17 illustrates a top plan view of an uncorrected photomask.

FIG. 15 shows a first top plan view of the patterned photoresist material 78 in its un-expanded state, as produced by a portion of a first photomask 65 (FIG. 7) which has been used to produce the patterned photoresist 78. The portion of the first photomask 65 is shown in FIG. 17, and it will be understood that the entire photomask will be much larger in extent than shown and will generally be configured to mask multiple photoresist areas to produce multiple components. The photomask 65 includes transparent areas 67 and opaque area 66 as discussed above in reference to FIG. 7. The transparent area 67 thus generally corresponds in size and configuration to the photoresist channel 76 shown in FIG. 15.

The photoresist channel 76 before shrinking is compared with the overlaid view of the target P2 pole tip 64 designed to be produced by the process. Again a portion of the target P2 pole tip 64 will be included in the ABS 24, and the straight portion 52 and flared portion 54 are shown. The flare points 56 at which the straight portion 52 flares out into the flared portion 54 are shown as well as the preferred range 58 within the flare points 56 should lie. The photoresist channel 76 is shown before it has been reduced in width using a channel shrinking film to ideally produce the shape of the target P2 pole tip 64. As discussed above, the photoresist is then treated with photoresist channel shrinking film 80 (see FIG. 9), and the walls of the photoresist material expand inward to produce a reduced width channel 82 (see FIG. 10), which would ideally assume the outline of the target P2 pole tip 64 shape, as indicated by the arrows 3 showing generally the direction of movement as the photoresist material expands.

If the expansion of the photoresist material were perfectly linear, this might produce the ideal result desired. However, due to the existence of corners and other geometrical features of the photoresist channel, the walls of the expanded photoresist do not move linearly, but instead tend to bulge in the middle, producing a configuration more closely resembling the distorted expanded photoresist 93 shown in FIG. 16. This produces a distorted channel 94 having distortions 91, such as convex walls 95. If P2 pole plating material were used to fill this distorted channel 94, a distorted P2 pole would be produced. The target P2 pole configuration 64 is shown in dashed lines for comparison. The flare points 56, which ideally would be positioned within the preferred range 58, would thus be configured either as near or far flare points, or in the case illustrated, are not identifiable at all. Once again, arrows 3 are included showing generally the direction of movement as the photoresist material expands.

It should be understood that the distortion produced by the photoresist expansion is a complex phenomenon and the shape of the distortion illustrated in FIG. 16 is not to be taken as a literal depiction of the end configuration of this process. These of skill in the art will recognize that the shape of the distortion may take many various shapes and it is not intended that the distortion illustrated be construed as a limitation.

Figure 18:
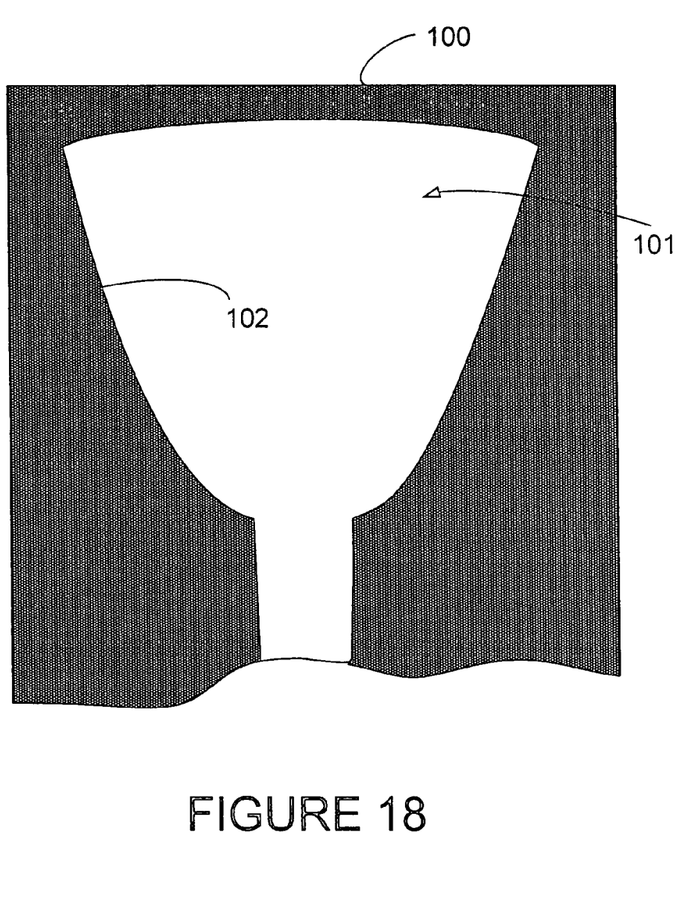
FIG. 18 illustrates a top plan view of a distortion-corrected photomask.
Figure 19:
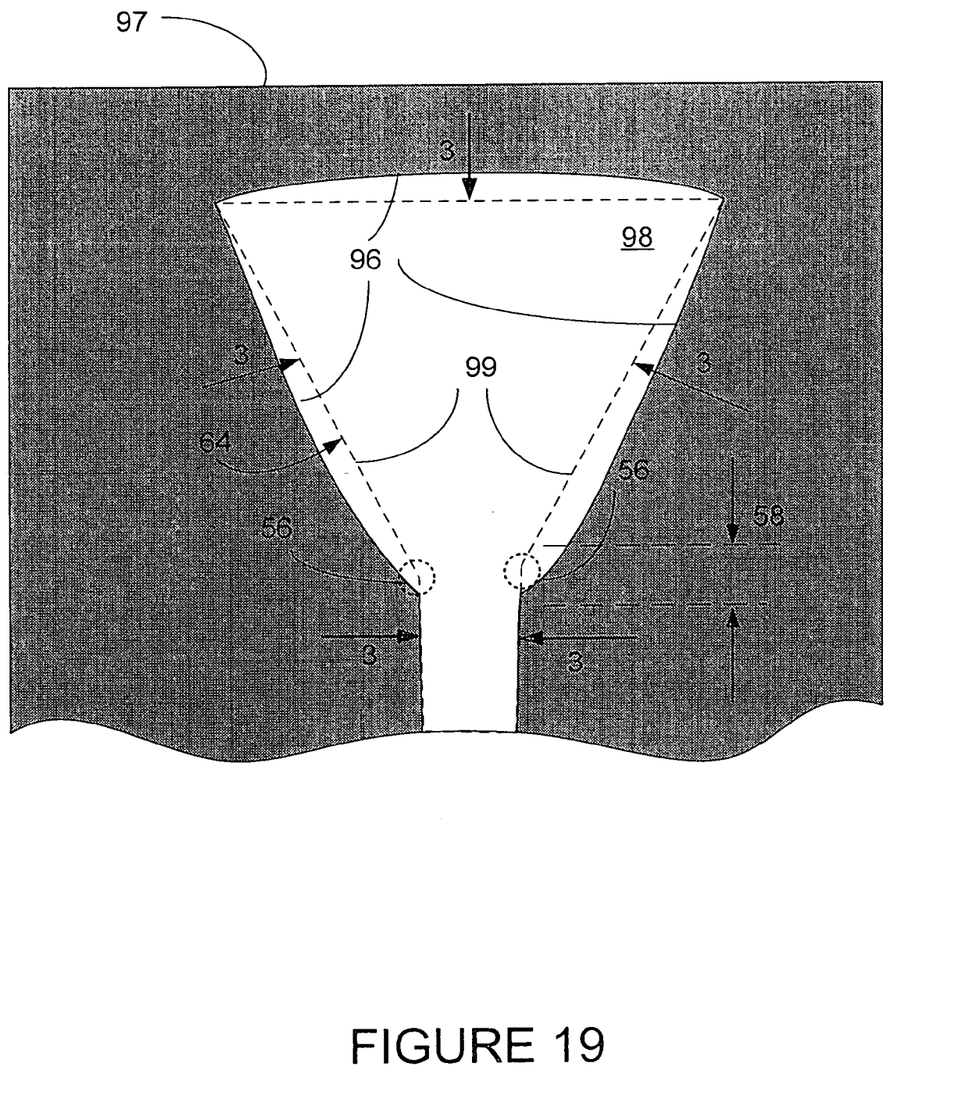
FIG. 19 illustrates a top plan view of distortion-corrected photoresist.

FIGS. 18 and 19 show a means of the present invention for compensating for the distortions discussed above, in order to produce a less distorted expanded photoresist. FIG. 18 shows a distortion-corrected photomask 100 having a distortion-corrected transparent area 101 in which the sides 102 are curved in convex arcs.

As depicted in FIG. 19, using this distortion-corrected photomask 100 the photoresist material in the unexpanded state has been configured with concave walls 96 to produce the distortion-corrected photoresist 97 shown in FIG. 19. This distortion-corrected photoresist 97 has a distortion corrected channel 98, which will produce a distortion-corrected expanded photoresist 99, indicated by the dashed outlines 64, when treated with the photoresist channel shrinking film and baked as discussed above. Again, arrows 3 show generally the direction of movement as the photoresist material expands. The outline of the distortion-corrected expanded photoresist 99 now approximates the target P2 pole configuration 64 with flare points 56, now shown to be within the preferred range 58.

Figure 20:
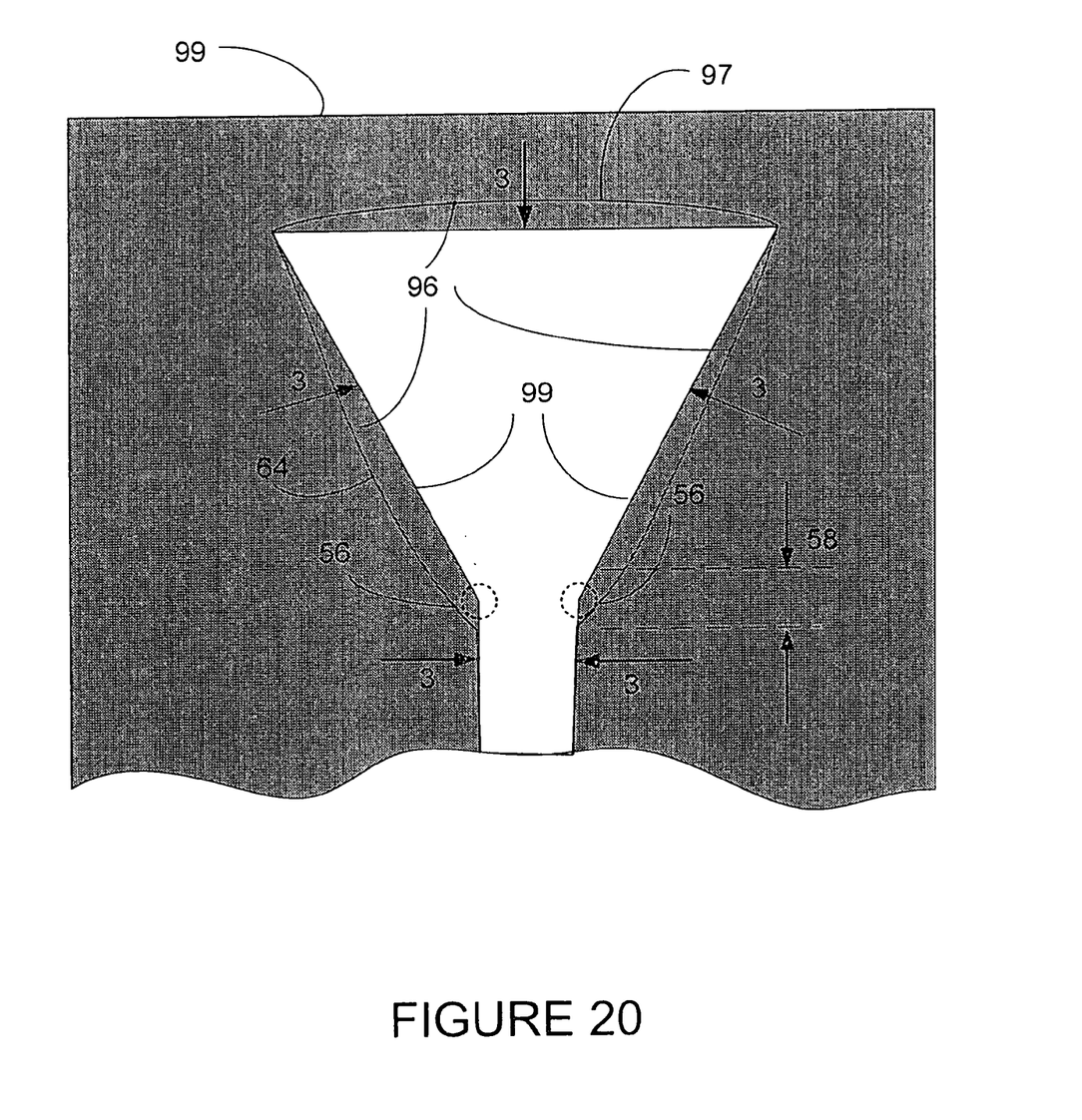
FIG. 20 illustrates a top plan view of distortion-corrected expanded photoresist.

FIG. 20 shows the distortion-corrected expanded photoresist 99 with the outline of the unexpanded distortion corrected photoresist 97 shown in dashed lines, again with arrows 3 showing generally the direction of movement has taken as the photoresist material expanded. The distortion-corrected expanded photoresist 99 now corresponds closely with the desired target P2 pole tip configuration 64 including flare points 56 that lie within the preferred range 58, and thus can be expected to produce the desired performance.

The method of the present invention for producing a distortion-corrected expanded photoresist 99 refers generally to FIGS. 15-20 and involves designing a desired target configuration 64 for the finished P2 pole tip design, including acceptable ranges 58 of parameters or limitations for the geometric features of the P2 pole tip, including the positions of the flare points 56. From this target P2 configuration 64, a first photomask 65 is produced which will produce a first patterned photoresist 78. This first patterned photoresist 78 is then treated with photoresist channel shrinking film 80 as described above. The material is baked to expand the photoresist material and thus shrink the photoresist channel 76 to produce a reduced width channel 82. The photoresist channel shrinking film 80 is then removed, as described above.

This produces a distorted expanded photoresist 93, which is plated to produce a distorted P2 pole. This distorted P2 pole is then compared to the target P2 pole configuration 64 and analyzed to determine which features of the distorted P2 pole violate the acceptable target geometric limits. A distortion-corrected photomask 100 is then produced which uses the analysis of the distorted P2 pole to a produce a distortion-corrected photoresist 97, which is then treated with photoresist channel shrinking film 80 and baked to produce a distortion-corrected expanded photoresist 99. This distortion-corrected expanded photoresist 99 is again used to produce a sample P2 pole, which is then compared to the parameters of the target P2 pole configuration 64 and analyzed to determine whether the parameters are met. If not, the process is repeated, with a second distortion-corrected photomask 100 being prepared to produce a second distortion-corrected expanded photoresist 99, and a second sample P2 pole, whose parameters are compared to the parameters of the target P2 pole configuration. This process is repeated until a final distortion-corrected photomask produces a final distortion-corrected expanded photoresist 99, which in turn produces a final sample P2 pole, whose parameters, including the positions of the flare points, are within the acceptable range established by the target P2 pole configuration.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabricating a write pole for a magnetic recording head, comprising:

A) providing a target P2 pole configuration;

B) providing a wafer stack;

C) forming a photoresist layer on said wafer stack;

D) providing a first photomask having a pattern, and positioning said photomask between said photoresist layer and a light source;

E) exposing said first photomask and said photoresist to said light source such that said pattern of said first photomask is transferred to said photoresist to create a patterned photoresist having at least one photoresist channel;

F) forming a layer of photoresist channel shrinking film on said patterned photoresist;

G) baking said photoresist channel shrinking film to produce a reduced width photoresist channel in an expanded photoresist;

H) removing said photoresist channel shrinking film;

J) electroplating a P2 pole tip within said reduced width channel of said expanded photoresist to form a P2 pole tip;

K) comparing said P2 pole tip with said target P2 pole configuration to identify distortions;

L) using said identified distortions to produce a distortion-corrected photomask;

M) using said distortion corrected photomask to produce a distortion-corrected expanded photoresist; and N) using said distortion-corrected expanded photoresist to produce a distortion-corrected P2 pole tip.

2. The method of claim 1, wherein:

M) comprises producing a distortion-corrected photoresist which is treated with photoresist channel shrinking film to produce said distortion-corrected expanded photoresist.

3. The method of claim 1, wherein:

K)-N) are repeated at least once to produce a distortion-corrected P2 pole tip with geometric features within acceptable limits of said P2 target configuration.

4. The method of claim 1, wherein said wafer stack comprises:

a P1 pole layer;

a write gap layer formed on said P1 pole layer; and a seed layer formed on said write gap layer.

5. The method of claim 1, wherein:

said photoresist channel shrinking film is chosen from a group consisting of SAFIER™ and RELACS®.

6. The method of claim 1, wherein:

said pattern of said photomask is formed of transparent areas, and said distortion-corrected photomask is produced by modifying said transparent areas of said photomask.

7. The method of claim 1, wherein:

distortions are produced by convex walls in said distorted expanded photoresist and said distortion-corrected photomask is produced by modifying said transparent areas of said photomask to produce a distortion-corrected photoresist having concave walls.

8. A method for fabricating a P2 pole tip for a magnetic recording head, comprising:

A) forming a photoresist layer on a wafer stack;

B) providing a target P2 pole configuration;

C) providing a photomask having a pattern, and transferring said pattern to said photoresist layer to create a patterned photoresist having at least one photoresist channel;

D) using a layer of photoresist channel shrinking material on said patterned photoresist to produce a reduced width photoresist channel in an expanded photoresist;

E) forming a P2 pole tip within said reduced width channel of said expanded photoresist to form a P2 pole tip;

F) comparing said P2 pole tip with said target P2 pole configuration to identify distortions;

G) using said identified distortions to produce a distortion-corrected photomask;

H) using said distortion corrected photomask to produce a distortion-corrected expanded photoresist; and I) using said distortion-corrected expanded photoresist to produce a distortion-corrected P2 pole tip.

9. The method of claim 8, wherein C) comprises:

i) providing a photomask having a pattern, and positioning said photomask between said photoresist layer and a light source; and ii) exposing said photomask and said photoresist to said light source such that said pattern of said photomask is transferred to said photoresist to create a patterned photoresist having at least one photoresist channel.

10. The method of claim 8, wherein D) comprises:

i) forming a layer of photoresist channel shrinking film on said patterned photoresist;

ii) baking said photoresist channel shrinking film to produce a reduced width photoresist channel in an expanded photoresist; and iii) removing said photoresist channel shrinking film.

11. The method of claim 8, wherein:

E) comprises electroplating a P2 pole tip within said reduced width channel of said expanded photoresist to form a P2 pole tip.

12. The method of claim 8, wherein:

H) comprises producing a distortion-corrected photoresist which is treated with photoresist channel shrinking film to produce said distortion-corrected expanded photoresist.

13. The method of claim 8, wherein:

F)-I) are repeated at least once to produce a distortion-corrected P2 pole tip with geometric features within acceptable limits of said P2 target configuration.

14. The method of claim 8, wherein A) comprises:

i) providing a wafer stack; and ii) forming a photoresist layer on said wafer stack.

15. The method of claim 8, wherein said wafer stack comprises:

a P1 pole layer;

a write gap layer formed on said P1 pole layer; and a seed layer formed on said write gap layer.

16. The method of claim 8, wherein:

said photoresist channel shrinking material is chosen from a group consisting of SAFIER™ and RELACS®.

17. The method of claim 8, wherein:

said pattern of said photomask is formed of transparent areas, and said distortion-corrected photomask is produced by modifying said transparent areas of said photomask.

18. The method of claim 8, wherein:

distortions are produced by convex walls in said distorted expanded photoresist and said distortion-corrected photomask is produced by modifying said transparent areas of said photomask to produce a distortion-corrected photoresist having concave walls.

* * * * *